United States Patent
MacMillan et al.

[15] 3,700,766
[45] Oct. 24, 1972

[54] METHOD FOR PRODUCING SOLUTIONS OF HIGH ALUMINA CONCENTRATION BY ALKALINE EXTRACTION OF ALUMINUM CONTAINING OIL SHALE

[72] Inventor: Robert T. MacMillan, Silver Spring, Md., and Jesse Jackson, Jr., Washington, D.C.

[22] Filed: Aug. 16, 1971
[21] Appl. No.: 172,204

Related U.S. Application Data

[63] Continuation-in-part of Ser. No. 861,162, Sept. 25, 1969, abandoned.

[52] U.S. Cl. ................................................423/119
[51] Int. Cl. ................................................C01f 7/02
[58] Field of Search.........................23/52, 141, 143

[56] References Cited

UNITED STATES PATENTS 3,389,975   6/1968   Van Nordstrand........23/52 X
3,459,502   8/1969   Van Nordstrand..........23/143
3,481,695   12/1969  Hite..............................23/52
3,510,255   5/1970   Hall et al. ......................23/52
3,516,787   6/1970   Van Nordstrand..........23/143
3,642,433   2/1972   Dyni................................23/52

Primary Examiner—Herbert T. Carter

[57] ABSTRACT

Aluminum values are leached from retorted oil shale with 0.5N to 1N sodium hydroxide solution present in sufficient quantity such that the mol ratio between sodium in the solution and aluminum in the shale is in a range of 2:1 to 2.5:1 ($Na_2O:Al_2O_3$). As pH falls to 12 during extraction, the liquid is fortified with additional NaOH to raise pH above 12. Mol ratio between said additional NaOH and undissolved aluminum, expressed as $Na_2O:Al_2O_3$, is in a range of 1:3 to 1:1.

10 Claims, No Drawings

METHOD FOR PRODUCING SOLUTIONS OF HIGH ALUMINA CONCENTRATION BY ALKALINE EXTRACTION OF ALUMINUM-CONTAINING OIL SHALE

This is a continuation-in-part of application S.N. 861,162 filed Sept. 25, 1969 and now abandoned.

It has been recently discovered that the large deposits of oil shale in this country, particularly those in Colorado, contain, besides oil shale, substantial amounts of aluminum. Discovery of a practical way to recover the aluminum content of the shale would be of great value because commercial sources of bauxite, the only aluminum ore exploited at present, are extremely limited in the United States. More than 85 percent of the bauxite used is imported. The quantity of aluminum available in Colorado oil shale could supply the aluminum needs of the United States for many years.

In copending U.S. patent applications Ser. No. 749,968 filed Aug. 5, 1968 now U.S. Pat. No. 3,642,433 and Ser. No. 789,618 filed Jan. 7, 1969 now U.S. Pat. No. 3,481,695 it is shown how dilute sodium hydroxide solution can be employed to leach aluminum values from dawsonitic and non-dawsonitic oil shale after it has been retorted at temperatures of 300°C and higher. The economic drawback to this process is that only relatively small concentrations of aluminum values in the dilute NaOH solution (1N or less) can be achieved so that large quantities of solution are needed to dissolve all the aluminum. If more concentrated NaOH solutions (e.g., 2N or more) are employed, the solution attacks and dissolves impurities such as silica rather than significant amounts of aluminum so that only relatively small amounts of aluminum values are still dissolved per volume of solution.

We have now developed a sodium hydroxide leaching process wherein the concentration of aluminum values in sodium hydroxide solution can be more than doubled. Basically the process comprises initially leaching retorted oil shale with a dilute solution of NaOH in sufficient quantity such that the ratio, prior to extraction, between sodium in solution and aluminum in the shale, expressed as a $Na_2O:Al_2O_3$ mol ratio, is about 2:1 to about 2.5:1. Thereafter, as aluminum goes into solution and the pH falls to 12, additional NaOH is injected into the leach solution in an amount such that the mol ratio of said additional NaOH (expressed as $Na_2O$) to undissolved aluminum (expressed as $Al_2O_3$) is in a range of about 1:3 to about 1:1.

It is therefore an object of the present invention to increase the concentration of aluminum values in a sodium hydroxide solution in stepwise fashion during the extraction of such values from retorted oil shale.

Another object of the invention is to control the NaOH concentration of the leaching solution during the leaching of retorted oil shale. Other objects and advantages will be obvious from the following more detailed description of the present invention.

In the practice of the invention a single batch of retorted oil shale is treated with a body of dilute NaOH leach solution, and the additional NaOH is added to the shale-solution mixture in the manner set forth above. Alternatively, the process is carried out in a series arrangement where the solution contacts a plurality of shale samples. During such an operation, a conventional countercurrent serial leaching system is employed wherein a dilute NaOH solution contacts a first retorted shale sample, is separated therefrom when the pH drops to 12, is then fortified with additional NaOH in the manner prescribed, and then contacts another shale sample. This separation and fortification procedure is repeated for several samples.

As a further alternative the serial treatment can be carried out in an elongated zone in which the series of shale samples comprise one continuous body. Leaching solution passes longitudinally through the zone and is fortified with requisite amounts of NaOH at predetermined points along the path of travel.

Whichever contact system is employed, the concentration of the barren leaching medium, prior to initially contacting the shale, is about 0.5 to 1N NaOH (15.5 to 31 grams $Na_2O$/liter) preferably about 0.5 to 0.8N. Additionally, as stated above, the leaching medium is initially employed in sufficient quantity such that the ratio between sodium values in the barren solution to the aluminum values in the retorted shale, expressed as a $Na_2O:Al_2O_3$ mol ratio, is about 2:1 to about 2.5:1, preferably about 2.1:1 to about 2.3:1.

As the leach solution pH falls to 12 during extraction, it is fortified with additional NaOH. The amount of additional NaOH is dependent upon the amount of undissolved aluminum in the solids to be immediately extracted with the NaOH-enriched leach solution. More particularly, the ratio between these constituents, expressed as additional $Na_2O$ to undissolved $Al_2O_3$, is about 1:3 to about 1:1. Each time pH falls to 12, the NaOH enrichment procedure is followed.

The particular volume of solution to be employed per gram of shale is best determined experimentally, and mainly depends on the percentage of aluminum present in the shale. With most shales, about 2 ml to about 3 ml of solution per gram of retorted shale in the extraction zone is suitable. In a series type of operation, it may be necessary to intermittently add water to the leach solution to maintain an optimum liquid-to-solids ratio in the extraction zone.

Operating temperatures are not critical. Solution temperatures of 20°C to less than boiling are suitable. Conditions should be such that substantial losses of water through evaporation are avoided.

Aluminum hydroxide is ultimately precipitated from the leach solution in the prior art manner, e.g., by $CO_2$ treatment.

The following example illustrates the effectiveness of the present invention:

EXAMPLE 33g of minus 8-mesh retorted Piceance Creek Basin (Colorado) oil shale containing 2.85 percent aluminum was stirred for 20 minutes at 30°C with 100 ml of 0.8N NaOH solution ($Na_2O:Al_2O_3$ mol ratio = 2.3:1). The aluminum values in the resulting solution were calculated as $Al_2O_3$, and on this basis the solution contained 16g/l $Al_2O_3$. The extract solution was then fortified with additional NaOH and enough water to make 100 ml of solution, and then used to extract another 33 gram-sample of retorted shale containing the same amount of aluminum as the first sample. This procedure was carried out a total of 6 cycles, and the NaOH was added each time in an amount of from 0.5 to 1.0 grams. At the end of the 6 cycles the alumina concentration was 46.4g/l. In essentially the same cyclical test, except that all the NaOH was added at the beginning of the test, the maximum alumina concentration attainable in the leach solution was 18.3g/l.

Since the present invention enables much higher concentrations of alumina to be obtained in the leach solution, plant and operating costs are markedly reduced.

It is believed that the higher concentration of $Al_2O_3$ obtained in the leach solution is due to the fact that in the present invention the sodium hydroxide dissolves out substantially only aluminum values since the intermittent addition of predetermined amounts of NaOH to the solution results in a caustic concentration always favorable towards dissolution of aluminum but unfavorable towards dissolution of silica and other impurities.

We claim:

1. In a process for extracting aluminum values from aluminum-containing retorted oil shale by leaching said shale with a sodium hydroxide solution, and separating leachate solution from residue at the end of said leaching, the improvement comprising
    a. leaching said shale with NaOH solution having a concentration of about 0.5N to 1N, said solution being initially employed insufficient quantity such that the mol ratio between sodium in the barren leach solution and aluminum in said shale, expressed as $Na_2O:Al_2O_3$, is about 2:1 to about 2.5:1; and
    b. adding more sodium hydroxide to the leachate solution during leaching when solution pH falls to 12, said NaOH being added in an amount such that the mol ratio between said additional NaOH and undissolved aluminum, expressed as $Na_2O:Al_2O_3$, is about 1:3 to about 1:1.

2. The process of claim 1 wherein said $Na_2O/Al_2O_3$ mol ratio range in step (a) of claim 1 is about 2.1 to about 2.3.

3. The process of claim 1 wherein said leaching is carried out in a serial manner wherein said dilute solution contacts a first retorted shale sample, is separated therefrom when the pH falls to 12, is fortified with said additional NaOH to bring solution pH above 12, and is then employed to leach another shale sample.

4. The process of claim 1 wherein said dilute NaOH solution initially has a sodium hydroxide concentration of about 0.5 to about 0.8 normal.

5. The process of claim 1 wherein the solids-to-liquid ratio during extraction is about 2–3 ml liquid per gram of solid.

6. The process of claim 2 wherein said leaching is carried out in a serial manner wherein said dilute solution contacts a first retorted shale sample, is separated therefrom when the pH falls to 12, is fortified with said additional NaOH to bring solution pH above 12, and is then employed to leach another shale sample.

7. The process of claim 4 wherein said leaching is carried out in a serial manner wherein said dilute solution contacts a first retorted shale sample, is separated therefrom when the pH falls to 12, is fortified with said additional NaOH to bring solution pH above 12, and is then employed to leach another shale sample.

8. The process of claim 5 wherein said leaching is carried out in a serial manner wherein said dilute solution contacts a first retorted shale sample, is separated therefrom when the pH falls to 12, is fortified with said additional NaOH to bring solution pH above 12, and is then employed to leach another shale sample.

9. The process of claim 8 wherein said dilute NaOH solution initially has a sodium hydroxide concentration of about 0.5 to about 0.8 normal.

10. The process of claim 9 wherein said $Na_2O/Al_2O_3$ mol ratio range in step (a) of claim 1 is about 2.1 to about 2.3.

* * * * *